United States Patent [19]

Bernhardt et al.

[11] Patent Number: 4,473,283

[45] Date of Patent: Sep. 25, 1984

[54] ARRANGEMENT FOR DEVELOPING PHOTOMATERIALS IN ROTATABLE DRUM

[75] Inventors: Rainer Bernhardt; Walter Kremer, both of Bergneustadt; Helmut Petsching, Gummersbach, all of Fed. Rep. of Germany

[73] Assignee: Jobo-Labortechnik GmbH & Co KG., Gummersbach, Fed. Rep. of Germany

[21] Appl. No.: 501,816

[22] Filed: Jun. 7, 1983

[30] Foreign Application Priority Data

Jun. 7, 1982 [DE] Fed. Rep. of Germany ....... 3221432

[51] Int. Cl.$^{3}$ .......................... G03B 3/04; G03B 13/04

[52] U.S. Cl. ...................................... 354/323; 354/329

[58] Field of Search ................ 354/323, 324, 329, 330

[56] References Cited

U.S. PATENT DOCUMENTS 3,804,379 4/1974 Merz .................................. 354/329

3,977,876 8/1976 Ratowsky .......................... 354/329

3,982,259 9/1976 Baerle ................................ 354/329

4,035,818 7/1977 King .................................. 354/323

*Primary Examiner*—A. A. Mathews

*Attorney, Agent, or Firm*—Michael J. Striker

[57] ABSTRACT

An arrangement for developing photomaterials has a rotatable drum arranged to accommodate a photomaterial, a plurality of vessels for various treatment fluids, an arm having a free end rotatably connectable with the drum and turnable together with the latter between a substantially horizontal initial position for supplying a treatment fluid from one of the vessels into the drum for treatment of the photomaterial and an inclined emptying position for discharging a used treatment fluid from the drum after the treatment, a guide arranged so that the vessels are located near one another in a stack and displaceable to the drum for filling the latter, a stepping element including the arm and arranged to displace the vessel of the stack by a respective one of the vessels in a cycle with the turning of the arm, and a lifting member provided on the arm and arranged so as to upwardly tilt the vessel which has been displaced to the drum, to its pouring position of the treatment fluid.

15 Claims, 6 Drawing Figures

ARRANGEMENT FOR DEVELOPING PHOTOMATERIALS IN ROTATABLE DRUM

BACKGROUND OF THE INVENTION

The present invention relates to an arrangement for developing photomaterials in a rotatable drum accommodating a photomaterial.

Arrangements of the above mentioned general type are known in the art. In the known arrangements various treatment fluids for the development process are accommodated in a series of supply vessels. The characteristic feature of the known arrangements is that the drum is rotatably connected with its end opening to a free end of a turnable arm, and in this way the drum connectable with the arm can be displaced between two inclined working positions by a simple lifting and lowering movement of the arm. This arrangement is disclosed in the European patent application No. 81,108,169.4. In one case, the drum is located in a substantially horizontal initial position in which the treatment fluid from a supply vessel or spraying water flows via a lowering inlet pipe located in the arm for the respective treatment of the photomaterial in the drum. In another case, the drum is brought to an inclined emptying position so that the treatment fluid discharges in a return flow through the above mentioned inlet pipes when the treatment of the photomaterial is completed.

In the above described arrangement an automatic operation is carried out by an expensive control, in accordance with which a supply vessel inserted into a temperature bath is connected via a pressure air supply and a riser conduit with the inlet pipe and actuated via a pressure air control. A flowmeter monitors the quantity of the fluid which has been filled and ends the process. This automatic arrangement is too expensive for a photo amateur. The interested photo amateur has as a rule a manually operating developing device and therefore he is unwilling to make high investments for an automatic arrangement while the manual device still functions.

There are also professional automatic arrangements which require magnet valves or pumps with dosing devices for supply of the treatment fluid. These control means are costly and susceptible to failures. Since very aggressive treatment fluids are used in the arrangement, the magnet valves are encrusted and require a high service expenditures.

SUMMARY OF THE INVENTION

Accordingly, it is an object of the present invention to provide an arrangement for developing photomaterials, which avoids the disadvantages of the prior art.

More particularly, it is an object of the present invention to provide an arrangement for developing photomaterials which permits a price-favorable automation of the developing process and is characterized by a high reliability.

In keeping with these objects and with others which will become apparent hereinafter, one feature of the present invention resides, briefly stated, in an arrangement in which supply vessels for various treatment fluids are arranged in a stack near one another, they are displaceable on a guide toward a pouring funnel which opens into a supply pipe, a turnable arm forms a drive part of a stepping mechanism for the displacement of the stack by one vessel in cycle with turning of the arm, and the arm has a jointly turnable lifting member for tilting upwardly the supply container located near the pouring funnel, from the stack into a pouring position for the treatment fluid.

For automating this arrangement, it is sufficient to provide a guide for the stack of the supply vessels, inasmuch as the control work for the transport of the vessels and the pouring of its contents is taken up by the turnable arm. The turnable arm, in addition to the known functions of connecting with the drum and emptying of the drum by turning of the arm, has now also further functions for the automation of the developing process. Furthermore, the turning upwardly of the arm suffices for pouring out via a jointly turnable lifting member of the vessel located near the pouring funnel. The treatment fluids are accommodated in the containers in the required measured quantities. During turning upwardly of the container, the entire contents can discharge and a quantity determination is no longer possible. The process temperature of the treatment fluid lies considerably above the limiting temperature described above in the case of use and is monitored by a temperature sensor in the drum which determines the duration of the treatment, as described in the older German patent application No. P 3,207,723.8. This application is hereby incorporated herein by reference.

For connecting the supply vessels with the guide, a plurality of travellers are provided which hold the vessels in the region of their openings and are both longitudinally displaceable and tiltable on the guide. The vessels are located on the guide normally in its lower position in which the contents of the open vessel normally does not discharge. By tilting upwardly of the arm, the vessel bottom displaces to a position which is higher than the vessel opening, and the vessel contents flows into the pouring funnel. When an upper rail is used for the guide, it can serve as a tilting axle for the longitudinally displaceable and turnable travellers.

The guide can be formed linearly so that in the beginning of the developing process the containers are arranged at one side of the pouring funnel on the guide, and after completing the process they reach the opposite side one after the other. When an annularly closed merry-go-round is used as the guide for the vessels, the vessel after completion of the working cycle lies again in its initial position, whereby handling of the arrangement is facilitated.

The above mentioned structural elements can be suspended on an attachment which can be brought by a photo amateur as a supplementary set. This attachment can be mounted on a conventional manual developing device and can subsequently be used in an automatic developing arrangement.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF THE PREFERRED EMBODIMENTS

Figure 1:
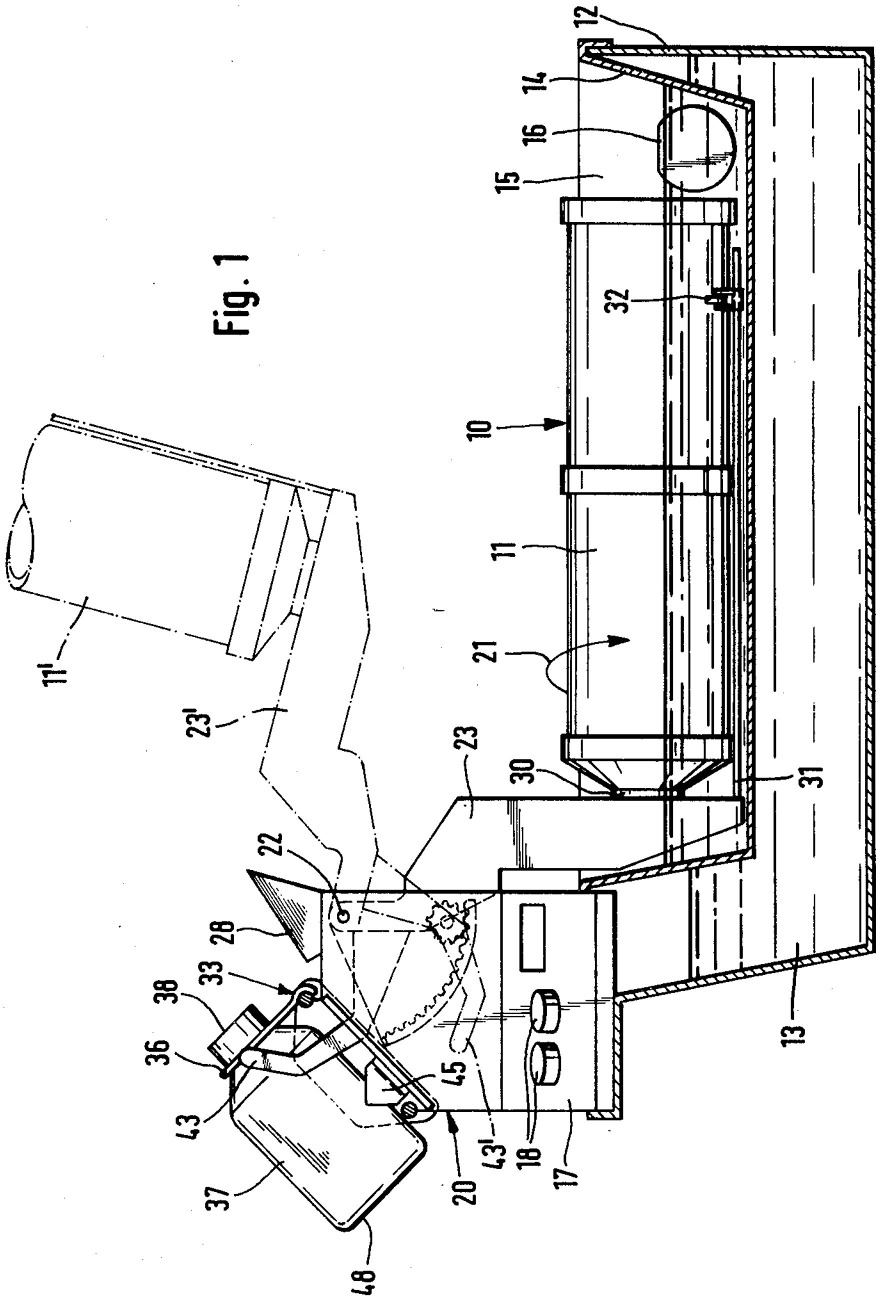
FIG. 1 is a view showing a longitudinal section of an arrangement for developing photomaterials in accordance with the present invention.

FIG. 1 shows an arrangement 10 for developing a photomaterial which is accommodated in a drum 11. The arrangement includes a basic equipment which permits a manual operation, without the inventive automatic development.

Figure 2:
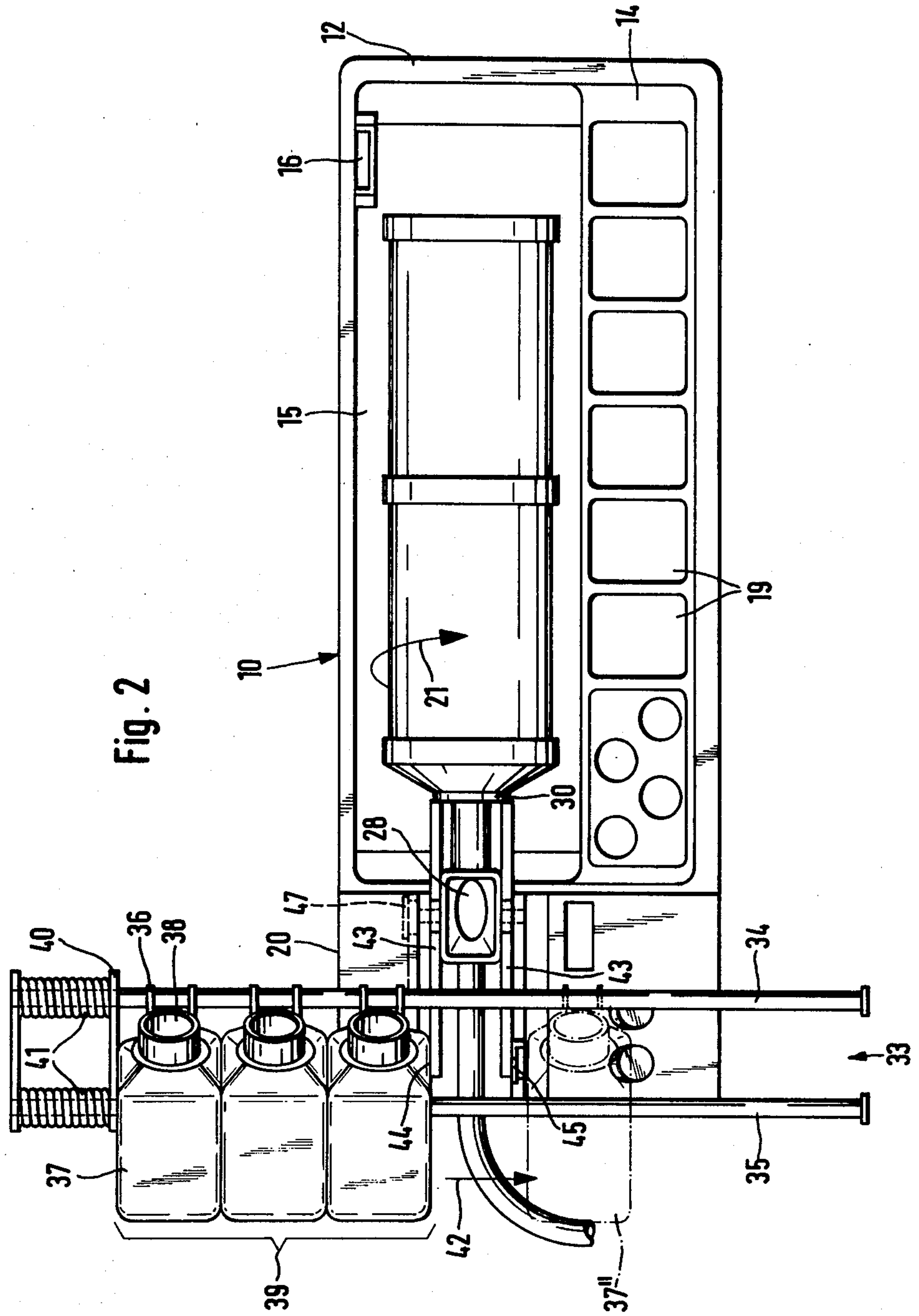
FIG. 2 is a plan view of the arrangement of FIG. 1 before start of its operation.

The basic equipment includes a container 12 which receives a temperature controlled water bath 13. The container 12 is closed from above by a shaped cover 14 which forms a channel 15. A water bath circulation is carried out by a not shown pump. The tempered water is supplied into the channel 15 and from there flows back again into the container 13 via an overflow passage 16. A control housing 17 is arranged laterally on the container 12 and has operating handles 18 and indicators which serve for heating of the tempered bath, the pump and the like. The cover 14 is finally provided with recesses 19, shown in FIG. 2. Aerosol or a reagent glass with a treatment fluid can be immersed into the water bath 13 of the container 12 through the recesses 19.

The inventive arrangement is also suitable, with completing the above mentioned basic equipment, for a fully automatic development of a photomaterial. For this purpose, an attachment 20 is mounted on the control housing 17, and a plurality of structural groups are arranged on the attachment. One structural group includes an arm 23 which is pivotally mounted on the attachment 20 via an axle 22, and a drum 11 which is selectively connectable with the free end of the arm 23 so that the drum and the arm together form a jointly turnable rigid structural unit.

Figure 5:
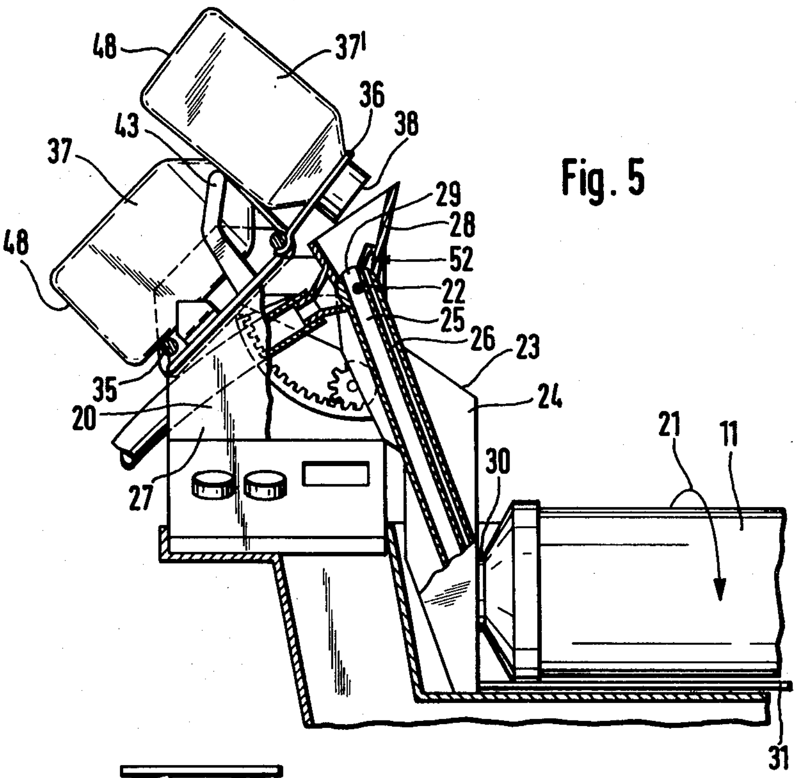
FIGS. 5 and 6 are a longitudinal section and a plan view, respectively, of the arrangement during a further working phase.

The inner design of the arm 23 can be recognized from FIG. 5. A combined pipe body is located under a coating 24 and includes an inlet pipe 25 and an air pipe 26 integrated in the latter. A pouring funnel 28 is arranged fixedly with the housing 27 of the attachment 20. In the initial position shown in FIGS. 1, 2 or 5 and 6, the pouring funnel 28 is in alignment with an inlet end 29 of the inlet pipe 25. The not shown outlet end of the inlet pipe 25 and the associated air pipe 26 open via an opening in a front end 30 of the drum 11 into the interior of the drum. A gear rim is also located in the region of this front end 30 of the drum and engages with a not shown pinion when the above mentioned initial position of FIG. 5 takes place. The drive motor of this pinion is accommodated in the control housing 17. Thereby the rotation of the drum in direction shown by the rotation arrow 21 is carried out. A supporting rod 31 is located at the free end of the arm 23 and carries a supporting roller 32. The periphery of the drum 11 is supported in the region of the drum bottom in a rotational manner with the aid of the supporting roller 32.

A further important structural group of the attachment 20 includes a guide 33 which is here formed linearly and composed of two parallel rods. More particularly it is composed of a higher rail 34 and a lower supporting strip 35. A system of travellers 36 is guided on the rail 34. The travellers 36 are firmly connected with the rail 34, on the one hand, and hold a respective supply vessel 37 for a predetermined treatment fluid in the region of a free vessel opening 38, on the other hand. With the aid of the traveller 36 on the guide 33, the individual vessels 37 are aligned with one another and arranged in a stack 39. A pressure member 40 acts onto the end of the stack 39 and is actuated by a spring loading 41, gravity force, and the like, in the direction identified by the transport arrow 42 in FIG. 2. The movement of the stack 39 in the transport direction 42 is, however, terminated by various stops of a stepping mechanism of which the above mentioned arm 23 is an important drive part.

A fork-shaped lifting member 43 is formed on the arm 23. When the drum 11 provided with a photomaterial to be developed is coupled with the arm 23 and the rigid structural unit composed of the drum 11 and the arm 23 is located in the initial position in which the drum 11 extends horizontally and is immersed in the water bath of the container 15, the lifting member 43 extends into the displacement path identified by the arrow 42 of the stack 39 so that an outer surface 44 of its tongue acts as a stop for the movement of the vessel 37. The vessel is located relative to the pouring funnel 28 at a side of the guide 33. The various treatment fluids for the development process are filled in sequence of their use one after the other into the various vessels 37 of the stack 39 in the respective required quantities. The treatment fluids are brought to a temperature considerably higher than the above described treatment temperature. Then the start actuator of the arrangement is released, whereupon the simple arrangement controls fully automatically the development process in the following manner.

Figure 3:
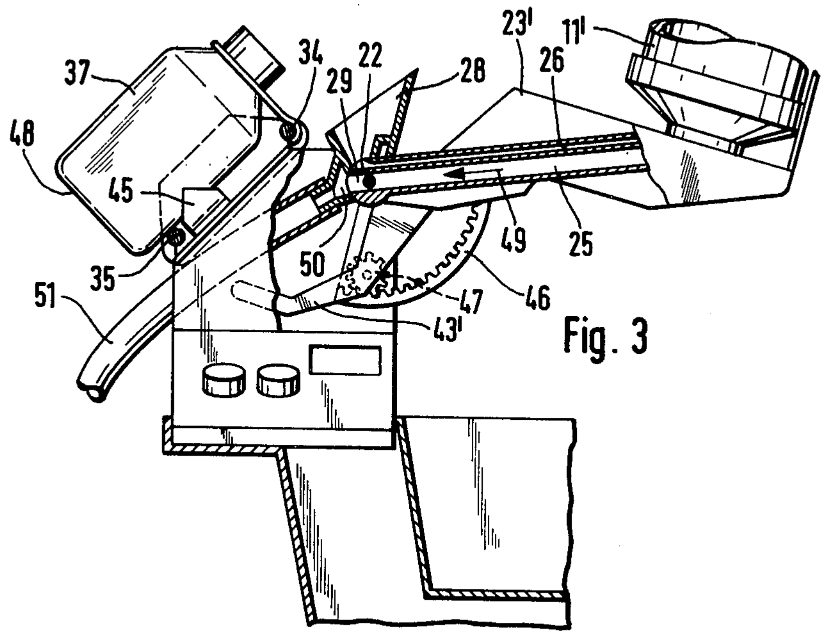
FIGS. 3 and 4 are a longitudinally sectioned lateral view and a plan view, respectively, or the arrangement in a later working phase.
Figure 4:
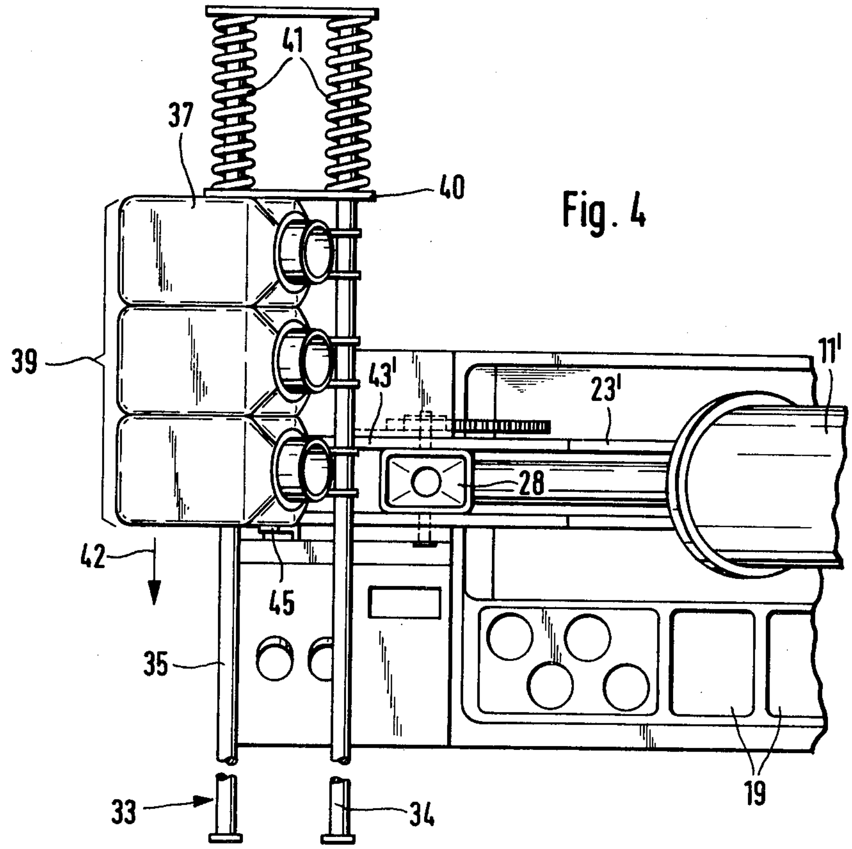

In a first working phase, the arm 23 is brought to an upper turning position identified with reference numeral 23' and shown in dash-dot lines, and the connected drum is transferred to an inclined emptying position identified with reference numeral 11', as will be described later in connection with FIGS. 3 and 4. Thereby, the lifting member which is seated on the arm 23' is turned to a deep position 43' and therefore withdrawn from the transport path 42 of the stack 39. The pressure member 44 can move further the stack 39 until the frontmost vessel 37 abuts against a fixed stop 45 located in the displacement path, as shown in FIGS. 3 and 4. The frontmost vessel 37 of the stack 39 is brought by this stop 45 to an aligned position with the pouring funnel 28. The vertical turning of the arm 23 is performed with the aid of the motor. For this purpose a toothed segment 46 is provided on the coating 24 and engages with a drive pinion 47 of a not shown lifting motor. By actuation of the motor, the pinion 47 rolls over the toothed segment 46 and lifts the arm and the drum to their positions 23' and 11'.

Then the lifting motor is again energized and the drive piston is rotated in a direction which is opposite to the direction of the preceding step. Thereby it rolls over the toothed segment 46 in opposite direction and displaces the arm with the drum to their initial positions 23 and 11, shown in FIGS. 5 and 6. Now the lifting member 43 is again displaced to its original high position and acts therefore in two ways. First of all, the outer surface 44 of the lifting member 43 acts, as explained in connection with FIG. 2, as a stop for the further movement of the remaining stack 39, inasmuch as it projects into the transport path before the second vessel 37. The pressure member 44 cannot move farther the second and third containers in the displacement direction identified with the arrow 42. The lifting member acts in alternating sequence with the stop 45 described in the preceding working step as a stepping mechanism.

The lifting member 43 has also a further function to turn upwardly the frontmost vessel which is aligned with the inlet funnel 28, to its pouring position 37' shown in FIG. 5. A vessel bottom 48 is brought to a higher position relative to the above mentioned vessel opening 38, so that the treatment fluid pours from the vessel into the inlet funnel 28 and from there flows via the inlet pipe 25 into the interior of the drum. The rotary drive 21 of the drum 11, as described hereinabove, operates in this initial position. The supplied treatment fluid cooperates with the photomaterial located in the drum 11 and leads to the required treatment in the development process. The treatment fluid, as mentioned hereinabove, is brought to a sufficiently high preliminary temperature which takes into account the cooling taking place during the process. It is not necessary to exactly maintain the temperature, inasmuch as the duration of treatment of this fluid in the drum 11 is controlled by a temperature sensing member in the drum, as described in connection with the above mentioned German patent application No. P 3,207,723.8, which is incorporated herein by reference. Thereby an optimum treatment of the photomaterial is guaranteed.

After running out of the optimal treatment period obtained from the individual temperature during the treatment, the temperature sensor in the drum 11 produces a control impulse and switches on the lifting mechanism for the arm 23. It brings the arm and the drum, via the toothed segment 46 and the pinion 47, to their emptying position 23' and 11' analogously to FIGS. 3 and 4. Now the inlet pipe 25 acts for emptying the drum fluid. It streams in direction of the arrow 49 in an opposite direction as compared with FIG. 5, from the steeply lifting up drum 11'. The inlet pipe acts, however, as shown in FIG. 3 as a movable part of a rotary valve whose pivot point is the above mentioned support axle 23 of the arm. The above mentioned inlet end 29 is turned back during turning of the arm 23' from its initial position to the region of the pouring funnel 28 and reaches an outlet chamber 50 formed near the funnel 28 and connected with an outlet pipe 51. The used treatment fluid flows out and can be again intercepted for regeneration.

During transfer of the lifting member to its deep position 43', the previously lifted frontmost vessel 37' is respectively lowered. Before it reaches the lower position of FIG. 3, in which the vessel bottom 48 assumes its deepest postion on the supporting strip 35 of the guide 33, the lifting member comes out of the transport path of the stack 39. The force loading of the spring 41 which acts onto the pressure member 40 acts thereby onto this frontmost vessel 37 and particularly before it reaches its definite lower position. This takes place when the frontmost vessel 37 lies clearly above the peripheral edge of the fixed strop 45. Thereby the frontmost vessel 37 together with the stack 29 is somewhat pressure further, while the lifting member moves further to its deep position 43'. The frontmost vessel 37 can therefore come with its lower lateral wall to abutment against the upper limit of the stop 45 and therefore remain against the supporting strip 35 in a respectively lifted position. The next supply vessel 37 are, while they are filled with the measured quantity of the respective treatment fluid, in the lower position which is determined by the inclined arrangement of the supporting strip 35 relative to the rail 34. These remaining vessels of the stack 39 push under the action of the pressure member 40 the frontmost vessel 37 over the fixed stop 45, and the now following second vessel 37 comes before the stop 45 to aligned position for pouring into the vessel 28. The first vessel in contrast reaches the emptying position 37" shown in dash-dot lines in FIG. 2.

This ends the working cycle for the transport of the first vessel and for the supply and discharge of its contents into the drum. The arm and drum lie in the emptying position 23' and 11' in accordance with FIGS. 3 and 4, with the difference that now, instead of the first vessel, the second vessel 37 is located at the stop 45. The first vessel is located, as can be seen in connection with FIG. 2, at the opposite side of the pouring funnel 28 in the emptying position 37". The working cycle with the second vessel now takes place in the respective manner. Then the working cycle for the third vessel follows.

Figure 6:
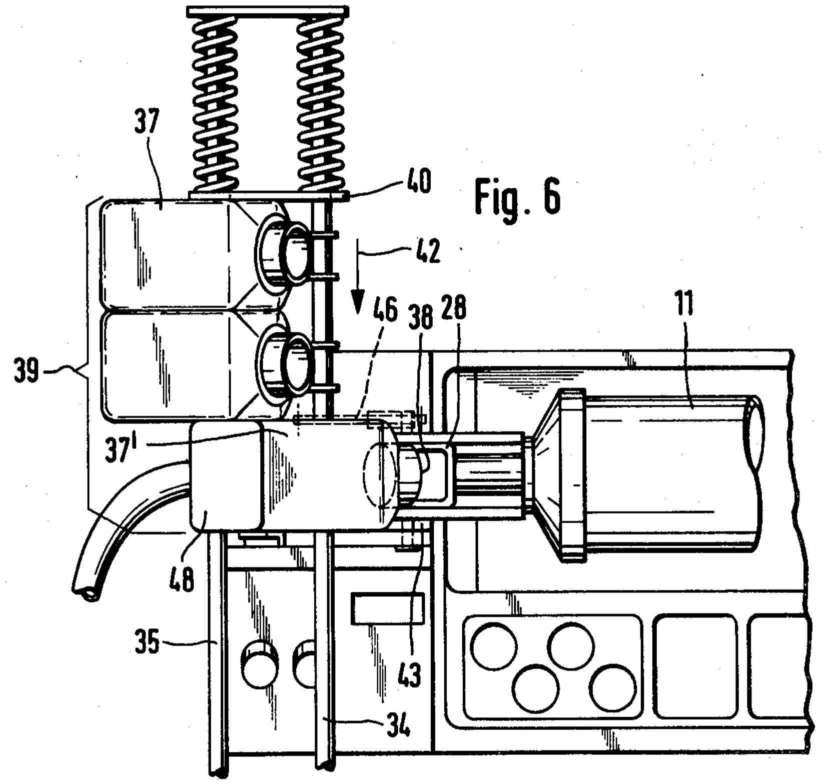

The above mentioned travellers 37 for holding the individual vessels 37 can not only permit a longitudinal displacement of the vessels 37 in the direction of the transport arrow 42 on the rail 34, but they also allow, as can be seen from FIGS. 5 and 6, the tilting movement of the vessel into its pouring position 37'. The travellers 36 are also suitable to be turned relative to the rail 34. The travellers 36 are composed in the shown embodiment of brackets which engage the individual vessels 37 at their necks and are mounted slidably displaceable and turnable on the rail 34. The deeply located strip 35 serves in the initial case as a support element for the vessel 37. It determines, as mentioned above, the lower position of the vessel 37.

In the shown embodiment the guide 37 is formed linearly. It is also possible, for economizing the space, to form the guide ring-shaped and closed in itself, whereby the individual vessels 37 of the stack 39 can move in a ring-like manner over a merrygoround. After revolution over such a merrygoround, the vessel, which is again in its initial position, in which it is again filled with treatment fluid to carry out the next developing process.

When the last vessel 37 has finished its working cycle in the inventive arrangement 10, the development of the photomaterial ends. The pressure member 40 reaches its end position in which it is maximally tensioned by the springs 41 acting thereupon. The working program of the arrangement is completed.

The lifting drive for the arm 23 and the above mentioned rotary drive for the drum 11 can be switched off, the process is finished. After the start of the arrangement 10, the operator can leave the arrangement. The above described working cycle for the supply and discharge of the various treatment fluids is carried out automatically. For this purpose, it is only necessary to have the displacement mechanism for turning up and down of the drum 11 which, in accordance with the invention, also performs the functions of a switch mechanism and a lifting mechanism for the vessel. As a result of this, an extremely space economical and cost-favorable manufacture of the arrangement is possible.

It is to be understood that there can be any number of such vessels 37 in the stack 39. Their number is adjusted in accordance with the type of the development process. The spraying which acts between the individual chemical substances can be carried out in simple manner so that the spraying medium is provided in vessels 37 of the stack in the respective sequence in the guide 33. It is of course also possible to provide water connections in the region of the pouring funnel 28.

The air pipe 25 guarantees that during filling and discharging of the treatment fluid no difficulties because of an air cushion take place. In the initial position of FIGS. 5 and 6, the upper end of the air pipe 26 is in alignment with an air chamber 52 near the funnel. The air, which is displaced during inflow of the treatment fluid into the drum 11, discharges via the air pipe 26 through the chamber 52 into the surroundings. When the drum comes to the emptying position of FIGS. 3 and 4, the upper opening of the air pipe 26, with the rotation of the inlet 29 of the inlet pipe 25, comes to another rotary position shown in FIG. 3. The opening is located now in alignment with the container 28 and guarantees that, from there, air can flow into the drum 11' when the used treatment fluid flows from it in direction of the flow arrow 49. The pipes 25 and 26 act therefore as a rotary valve with the associated structural elements in the region of the pouring funnel 28.

It is to be understood that, instead of the shown travellers 36, other guide elements can be used. Also, the guide 33 is not necessarily composed of two separate strips 34 and 35, while these structural elements have the simplest and least expensive construction.

It will be understood that each of the elements described above, or two or more together, may also find a useful application in other types of constructions differing from the types described above.

While the invention has been illustrated and described as embodied in an arrangement for developing photomaterials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for developing photomaterials, comprising a rotatable drum arranged to accommodate a photomaterial;

a plurality of vessels for various treatment fluids;

an arm having a free end rotatably connectable with said drum and turnable together with the latter between a substantially horizontal initial position for suppplying a treatment fluid from one of said vessels into said drum for treatment of the photomaterial, and an inclined emptying position for discharging a used treatment fluid from said drum after the treatment;

guide means arranged so that said vessels are located near one another in a stack and displaceable to said drum for filling the latter;

stepping means in which said arm forms a drive part and arranged to displace said vessels of said stack by a respective one of said vessels in cycle with the turning of said arm; and a lifting member provided on said arm and arranged so as to upwardly tilt the vessel which has been displaced to said drum, to its pouring position of the treatment fluid.

2. An arrangement as defined in claim 1; and further comprising an inlet pipe and a pouring funnel which opens into the former and is arranged so that in said substantially horizontal initial position the treatment fluid flows from said one vessel into said drum through said inlet pipe, and when said stack has been displaced by the respective vessel the latter approaches said pouring funnel.

3. An arrangement as defined in claim 1, wherein said vessels have vessel openings, said guide means having an axis; and further comprising a plurality of travellers arranged at the side of said vessel openings so that said vessels are held by said travellers on said guide means, said travellers being displaceable along said axis of said guide means and also tiltable relative to said axis.

4. An arrangement as defined in claim 1, wherein said vessels have vessel openings and vessel bottoms, said guide means being arranged to determine a lower position of each of said vessels in which its vessel bottom is located lower than its vessel opening.

5. An arrangement as defined in claim 3, wherein said guide means includes an upper guide member provided for longitudinal displacement of said travellers and also serving as a tilting axle for said travellers, and a lower guide member for slidingly supporting a lower end region of said vessels in said stack.

6. An arrangement as defined in claim 1; and further comprising force loading means arranged to act in one direction and to displace said stack on said guide means.

7. An arrangement as defined in claim 1, wherein said stack is displaceable along a predetermined displacement path, said lifting member in said initial position of said arm extending into said displacement path and forming a stop for a vessel which follows the upwardly tilted vessel.

8. An arrangement as defined in claim 7; and further comprising a fixed stop located before said lifting member relative to said displacement path and arranged to stop said arm of said stack in said emptying position and to place a next upwardly tilted vessel to said lifting member.

9. An arrangement as defined in claim 1, wherein said lifting member is mounted directly on said turnable arm.

10. An arrangement as defined in claim 2; and further comprising an outlet pipes located under said funnel for said drum, said lifting member being fork-shaped and having a fork opening for extending said outlet pipe therethrough.

11. An arrangement as defined in claim 10, wherein said inlet pipe has a pipe space which in said initial position communicates with said pouring funnel and in said emptying position communicates with said outlet pipe.

12. An arrangement as defined in claim 2, wherein said inlet pipe is also turnable and has an end which is located at the side of said funnel and serves as a rotary valve.

13. An arrangement as defined in claim 1, wherein said guide means is formed linearly so as to provide a linear displacement of said vessels in said stack.

14. An arrangement as defined in claim 1, wherein said guide means is formed as an annularly closed merry-go-round so as to provide an annular displacement of said vessels in said stack.

15. An arrangement as defined in claim 1; and further comprising means forming a tempering bath, and an attachment provided on said means and formed so that said guide means for displacing said vessels, said turnable arm for turning said drum, and said lifting member for tilting a respective one of said vessels are arranged on said attachment.

* * * * *